United States Patent [19]

Kitamura et al.

[11] Patent Number: 4,818,906
[45] Date of Patent: Apr. 4, 1989

[54] VEHICLE MOUNTED A.C. GENERATOR

[75] Inventors: Yutaka Kitamura; Hiroaki Aso, both of Chiyoda, Japan

[73] Assignee: Mitsubishi Denki Kabushiki Kaisha, Tokyo, Japan

[21] Appl. No.: 35,427

[22] Filed: Apr. 7, 1987

[30] Foreign Application Priority Data

Apr. 7, 1986 [JP] Japan .................................. 61-81471

[51] Int. Cl.$^4$ .............................................. H02K 9/00
[52] U.S. Cl. ........................................ 310/58; 310/54; 310/68 D
[58] Field of Search .................... 310/68 R, 68 D, 263, 310/54, 58, 59, 60 R, 64, 89, 52, 65; 123/41.31, 41.44, 41.56, 41.57, 195 E

[56] References Cited

U.S. PATENT DOCUMENTS

| | | | |
|---|---|---|---|
| 3,733,503 | 5/1973 | Potter | 310/54 |
| 4,221,982 | 9/1980 | Raver | 310/54 |
| 4,262,224 | 4/1981 | Kofink | 310/54 |
| 4,293,788 | 10/1981 | Binder | 310/68 D |
| 4,739,204 | 4/1988 | Kitamura et al. | 310/68 D |

FOREIGN PATENT DOCUMENTS

| | | | |
|---|---|---|---|
| 0083557 | 5/1984 | Japan | 310/263 |
| 0141467 | 4/1920 | United Kingdom | 310/54 |

Primary Examiner—R. Skudy
Attorney, Agent, or Firm—Sughrue, Mion, Zinn, Macpeak and Seas

[57] ABSTRACT

A belt driven vehicle alternator is enclosed by front and rear brackets/casing members 26, 30 which, in combination with an aluminum housing 24 surrounding the rotor and stator cores/coils, define flow passages for a liquid coolant branched off from the engine cooling system. The coolant inlet and outlet ports 28, 29 are both provided in the rear casing member 30 and are circumferentially proximate each other to minimize the space occupied by the alternator cooling system and tubes in the crowded engine compartment.

3 Claims, 6 Drawing Sheets

VEHICLE MOUNTED A.C. GENERATOR

BACKGROUND OF THE INVENTION

The present invention relates to an A.C. generator to be driven by an engine of a vehicle such as an automobile and, particularly, to an improvement of a cooling system of such an A.C. generator.

A typical example of a conventional vehicle mounted A.C. generator is shown in Japanese kokai No. 83557/1984, which is shown, in cross section, in FIG. 1 of this application, which corresponds to FIG. 4 of the kokai. In FIG. 1, a rotary shaft 1 of the generator is driven by an engine of a vehicle through a pulley 2. A rotor 3 of the generator is mounted on shaft 1, and includes a pair of magnetic cores 4 between which an exciting coil is supported. Stator cores 5 are arranged in facing relation to the cores 4 with small gaps therebetween. Each stator core 5 supports a stator coil 6 in its slot.

The stator cores 5 are supported by a bracket 7 in which a circular coolant passage 8 is formed coaxially with the stator cores 5. A coolant inlet 9 and a coolant outlet 10 are formed in a front portion of the bracket 7 with an angle of 180° therebetween to guide a coolant from the inlet 9 through the coolant passage 8 to the outlet 10. In the coolant passage 8, a plurality of heat radiating fins 11 are formed.

FIGS. 2 and 3 show a mounting of the A.C. generator to the vehicle engine. In these figures, reference numerals 12, 13, 14 and 15 depict the vehicle engine for driving the generator through the pulley 2, a cylinder block of the engine, a water jacket provided around the cylinder block 13 and a radiator for cooling the coolant heated in the water jacket 14, respectively. The radiator 15 is connected to the water jacket 14 through an upper hose 16 and a lower hose 17. The coolant which is pressurized in the lower hose 17 by a water pump 18 is supplied to the water jacket 14 and flows therethrough and through the upper hose 16 to the radiator 15. A portion of the pressurized coolant flows through a tube 19 connected to the coolant inlet 9 into the coolant passage 8 in the bracket 7 and is returned through the outlet 10 and a tube 20 to the lower hose 17. Since the coolant is pressurized by the water pump 18, it can circulate through the passage to cool heat generating portions such as stator coil 6, etc., effectively.

In the vehicle mounted A.C. generator mentioned above which is arranged in the front side of an engine compartment in which sufficient space is not available, the coolant inlet 9 and outlet 10 are arranged in the bracket 7 with an angle of 180° therebetween. Therefore, the inlet 9, the outlet 10 and the tubes 19 and 20 which occupy a relatively large space generally may constitute obstacles against other components to be arranged in the engine compartment.

SUMMARY OF THE INVENTION

An object of the present invention is to provide a vehicle mounted A.C. generator in which the space occupied by a coolant inlet, a coolant outlet and tubes connected therewith is minimized to thereby eliminate the obstacle problem of them with respect to other components in an engine compartment.

According to the present invention, the coolant inlet and the coolant outlet of the generator are arranged in a rear bracket thereof around which a relatively large space is available. Further, the coolant inlet is arranged adjacent the coolant outlet, allowing a relatively large space to be given to other components in the engine compartment.

DETAILED DESCRIPTION OF THE PREFERRED EMBODIMENTS

Figure 1:
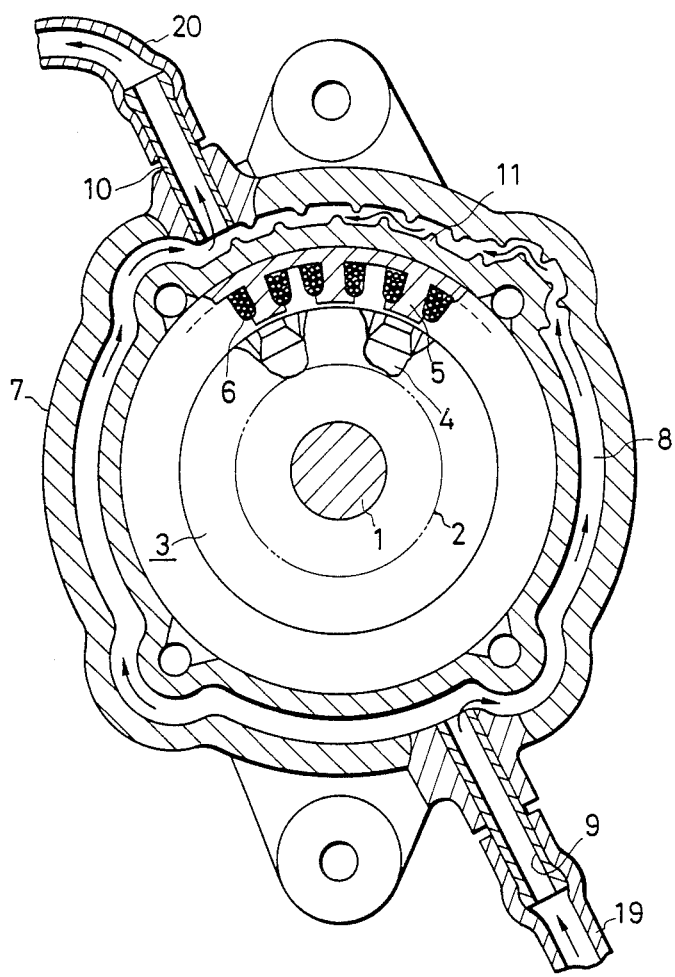
FIG. 1 is a cross sectional view of a conventional vehicle mounted A.C. generator.
Figure 2:
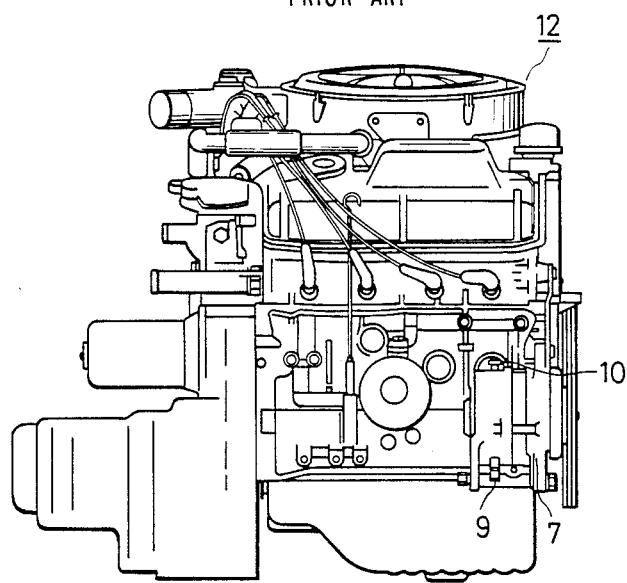
FIG. 2 shows a mounting of the generator to a vehicle engine.
Figure 3:
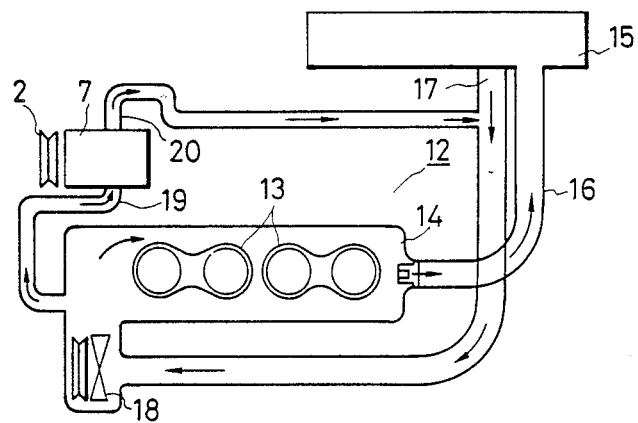
FIG. 3 shows a conventional cooling system, schematically.
Figure 4:
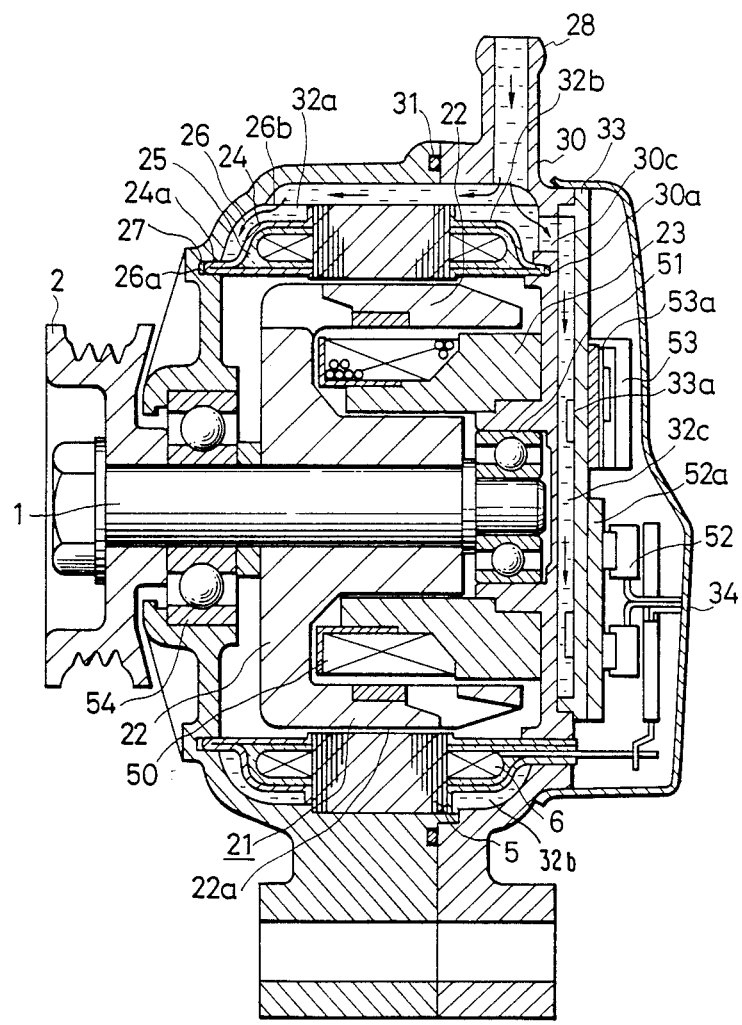
FIG. 4 is a longitudinal cross section of a vehicle mounted A.C. generator according to an embodiment of the present invention.

In FIG. 4, a rotor 21 has a rotary shaft 1 on which a magnetic core 22 is fixedly mounted. The magnetic core 22 is formed with a plurality of pole pieces 22a arranged peripherally equiangularly.

A fixed, annular exciting core 23 is disposed in a facing relation to an inner wall of the magnetic core 22 with a small air gap therebetween. On the exciting core 23, an exciting coil 50 is supported. Opposite ends of the stator coil 6 are covered by front and rear annular enclosure halves 24 of a high thermal conductivity metal material such as aluminum. The enclosure halves 24 are liquid-tightly fixed to opposite sides of the stator core 5, respectively, with spaces between the enclosure halves and the stator coil 6 being filled with an insulating filler 25 such as synthetic resin. A plurality of heat radiating fins 24b (FIG. 5) are formed peripherally on an outer side surface of each enclosure half 24.

A front bracket 26 supports a bearing 54 by which the rotor shaft 1 is rotatably supported. The front bracket 26 is formed in an inner surface thereof with an annular groove 26a in which a front annular end protrusion 24a of the enclosure half 24 is liquid-tightly received with an aid of a gasket 27 of viscous silicone material. An annular front coolant passage 32a is provided between the inner surface of the front bracket 26 and the outer side surface of the front enclosure half 24. A partition 26b is provided between the outer side surface of the front enclosure half 24 and the inner surface of the front bracket 26.

Figure 5:
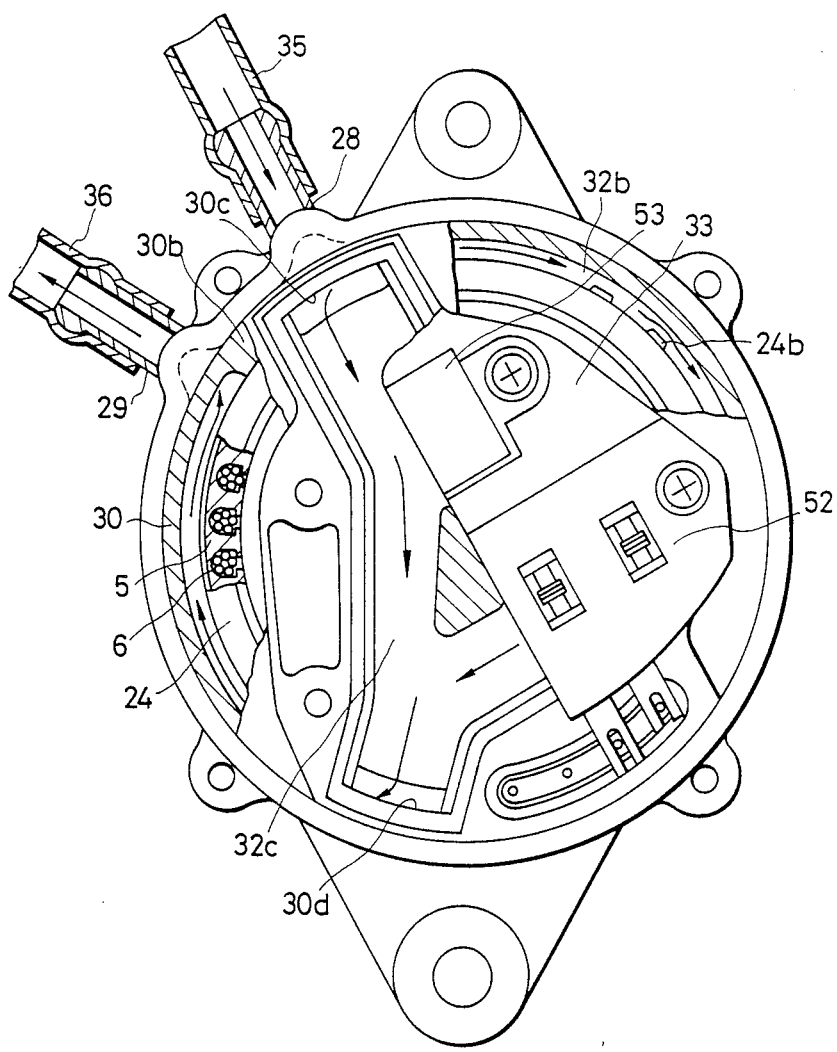
FIG. 5 is a partially cross sectioned front view of the generator in FIG. 4.

A rear bracket 30 is liquid-tightly connected through an O-ring 31 to the front bracket 26 and is formed in an inner wall thereof with an annular groove 30a in which a rear annular end protrusion 24a of the rear enclosure half 24 is liquid-tightly received with an aid of a viscous gasket 27. The rear bracket 30 is formed with a coolant inlet port 28 and an outlet port 29 closely adjacent thereto (at an angle of less than 90°) as shown in FIG. 5, and fixedly supports the exciting core 23 and a bearing 51. A coolant branch port 30c and a coolant return port 30d are also formed in the rear bracket 30. An annular rear coolant passage 32b is formed between the inner wall of the rear bracket 30 and the rear enclosure half 24, and a partition 30b is provided for separating a coolant inlet side from a coolant outlet side of the coolant passage.

Figure 6:
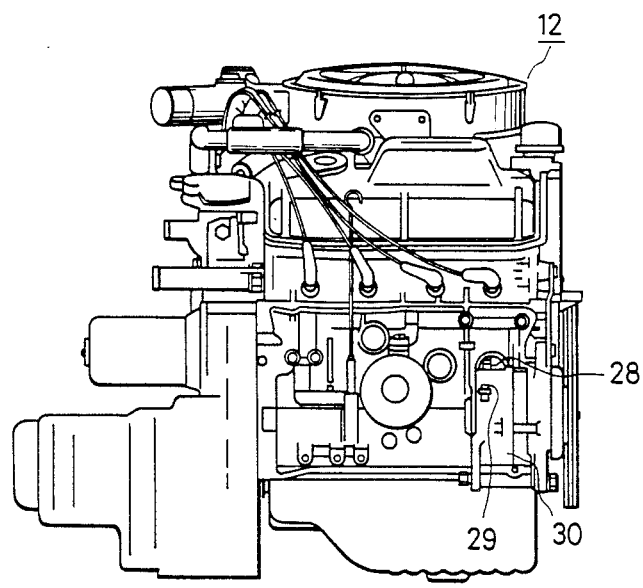
FIG. 6 shows a mounting of the generator in FIG. 4 to a vehicle engine.
Figure 7:
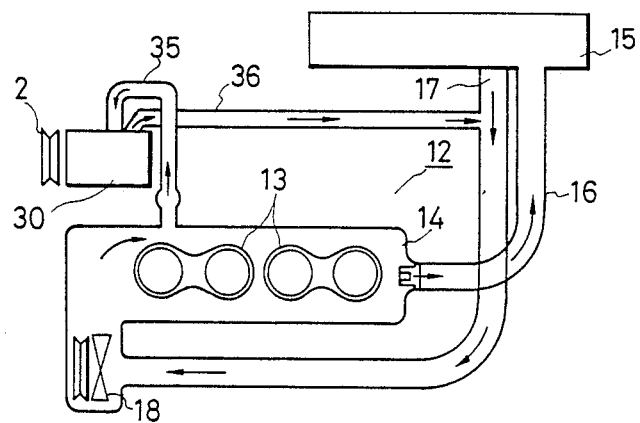
FIG. 7 shows a cooling system of the generator in FIG. 4.

The inlet port 28 is connected through a tube 35 to the water jacket 14 of the engine 12 and the outlet port 29 is connected through a tube 36 to the lower hose 17, as shown in FIGS. 6 and 7. As further seen in FIG. 6, the inlet and outlet ports lie in a common plane, and they are perpendicular to the rotor shaft (FIG. 4).

A cooling cover 33 of a high thermal conductivity metal is liquid-tightly secured to a rear end of the rear bracket 30 to form a branch coolant passage 32c therebetween so that the passage 32c extends from the branch port 30c to the return port 30d both of which are formed in the rear end of the rear bracket 30. A plurality of heat radiating fins 33a are formed on an inner surface of the cooling cover 33. A rectifier 52 is fixedly mounted through a heat sink 52a to an outer end surface of the cooling cover 33 and a voltage regulator 53 is also fixedly mounted through a heat sink 53a thereto, as shown in FIGS. 4 and 5. A protection cover 34 may be mounted on a rear side of the rear bracket 30.

In operation, a portion of an engine coolant at a relatively low temperature is branched and passes through the inlet port 28, the passage 32a and 32b and the outlet port 29 to the lower hose 17 of the engine 12, while cooling the stator core 5 and the stator coil 6.

A portion of the coolant flowing from the inlet port 28 into the passage 32b passes from the branch port 30c through the branch passage 32c to cool the rectifier 52 and the voltage regulator 53 indirectly through the cooling cover 33.

The front bracket 26 cooled directly by the coolant absorbs heat generated in the bearing 54. On the other hand, the rear bracket 30 absorbs heat generated in the bearing 51 and heat generated in the exciting coil 50 indirectly through the exciting core 23.

Due to the heat radiating fins 24b formed on the enclosure halves 24 and the heat radiating fins 33a formed on the cooling cover 33, heat exchange between the coolant and the heat generating and/or heat conducting elements is enhanced.

Thus, the stator coil 6, the rectifier 52, the voltage regulator 53 and the exciting coil 50 which generate considerable heat are effectively cooled by the coolant. Therefore, an increase of temperature is restricted substantially without the necessity of a cooling fan which is a source of considerable noise.

Since the inlet port 28 is provided adjacent the outlet port 29 in the rear bracket 30 around which a relatively large space can be provided, the cooling elements including the inlet port 28, the outlet port 29 and the respective tubes 35 and 36 do not constitute obstacles against mounting, maintenance and checking of the generator and/or other components in the engine compartment.

Figure 8:
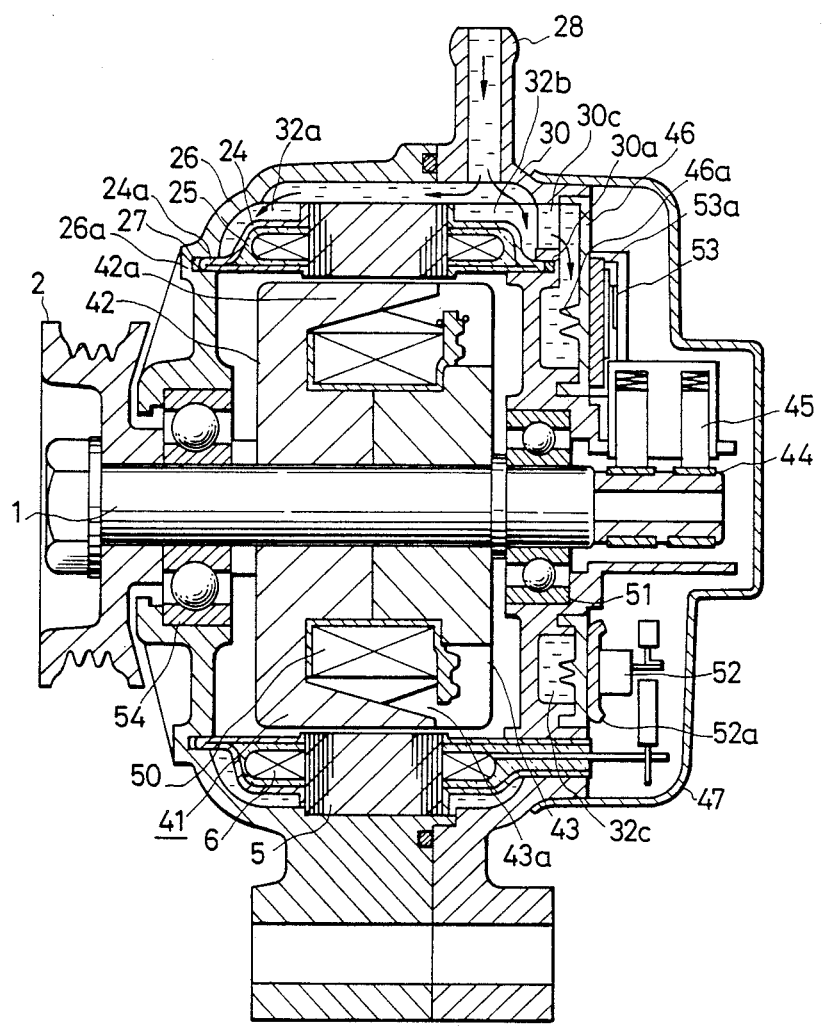
FIG. 8 is a longitudinal cross section of another embodiment of the present invention.

FIG. 8 is a similar view of another embodiment of the present invention to FIG. 4. In FIG. 8, a rotor 41 fixedly secured to a rotary shaft 1 is composed of a front magnet core 42, a rear magnetic core 43 and an exciting coil 50 supported by them. The front core 42 is formed with a plurality of rearwardly protruding pole pieces 42a and the rear core 43 is formed with a plurality of forwardly protruding pole pieces 43a. The pole pieces 42a are interleaved with the pole pieces 43a.

Reference numeral 44 depicts slip rings for supplying electric current to the exciting coil 50 the power generated by the generator is collected by brushes 45. A cooling cover 16 is liquid-tightly mounted to a rear bracket 30 to form a branch cooling passage 32c. A rectifier 52 and a voltage regulator 53 are mounted on the cooling cover 46. Reference numeral 47 depicts a protection cover.

The front and rear brackets 26 and 30 are directly cooled by the coolant to remove heat from internal air and, thus, the exciting coil 50 can be cooled effectively by the movement of internal air due to the rotation of the rotor 41.

It should be noted that, although, in the described embodiments, the coolant for the generator is branched from the engine coolant, it is possible to use a separate cooling medium for the purpose.

According to the present invention, the coolant is supplied through the inlet port provided in the rear bracket around which a relatively large space is available to the interior of the brackets and, after passing therethrough, is discharged from the outlet port which is provided in the vicinity of the inlet port of the rear bracket. Therefore, it is possible to improve the space economy of the engine compartment of the vehicle.

What is claimed is:

1. A vehicle mounted a.c. generator, comprising: a rotor shaft (1) adapted to be driven by a vehicle engine; a rotor core (22) fixedly secured to said shaft and adapted to be excited by an exciting coil (50); a stator core (5) disposed opposite an outer periphery of said rotor core and mounting stator coil (6); an enclosure half (24) enclosing at least a rear portion of the stator coil; a front bracket (26) and a rear bracket (30) sealingly joined together to define a housing supporting said stator core directly and said rotor shaft indirectly through bearings (51, 54); a rectifier (52) for rectifying an output voltage generated by said stator coil; a voltage regulator (53) for regulating an output voltage of said rectifier to a predetermined value; at least one annular coolant passage (32b) formed between said enclosure half of the stator coil and said rear bracket; a branch coolant passage (32c) formed along an end surface of said rear bracket, a coolant inlet port (28) formed in said rear bracket and connected to said annular coolant passage and said branch coolant passage; and a coolant outlet port (29) formed in said rear bracket and connected to said annular coolant passage and said branch coolant passage, said coolant inlet and outlet ports being disposed in a common plane orthogonal to said shaft with an angle between said inlet port and said outlet port being less than 90°, said stator coil, said rectifier and said voltage regulator being cooled by circulating a liquid coolant through said coolant passages.

2. A generator according to claim 1, wherein the branch coolant passage extends across said end surface of the rear bracket proximate the rectifier and voltage regulator in a chord-like manner, and further comprising a pair of ports (30c, 30d) individually communicating opposite ends of the branch coolant passage with the annular coolant passage.

3. A generator according to claim 2, further comprising a cover member (33; 46) sealingly overlying said end surface of the rear bracket, and wherein the branch coolant passage is defined by and between said rear bracket end surface and the cover member, and the rectifier and voltage regulator are mounted on an outer surface of the cover member.

* * * * *